United States Patent
Tao et al.

(10) Patent No.: US 10,114,374 B2
(45) Date of Patent: Oct. 30, 2018

(54) EMERGENCY HANDLING SYSTEM FOR AN AUTONOMOUS DRIVING VEHICLE (ADV)

(71) Applicant: Baidu USA LLC, Sunnyvale, CA (US)

(72) Inventors: Jiaming Tao, Sunnyvale, CA (US); Yifei Jiang, Sunnyvale, CA (US); Dong Li, Sunnyvale, CA (US); Jiangtao Hu, Sunnyvale, CA (US); Liyun Li, Sunnyvale, CA (US); Guang Yang, Sunnyvale, CA (US); Jingao Wang, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 15/353,322

(22) Filed: Nov. 16, 2016

(65) Prior Publication Data
US 2018/0136653 A1 May 17, 2018

(51) Int. Cl.
G05D 1/00 (2006.01)
G05D 1/02 (2006.01)

(52) U.S. Cl.
CPC ......... G05D 1/0088 (2013.01); G05D 1/0055 (2013.01); G05D 1/021 (2013.01)

(58) Field of Classification Search
CPC ..... G05D 1/0088; G05D 1/0055; G05D 1/021
USPC ........................................................ 701/27
See application file for complete search history.

(56) References Cited

U.S. PATENT DOCUMENTS

| | | | |
|---|---|---|---|
| 8,874,301 B1* | 10/2014 | Rao | B60K 28/066 180/272 |
| 2014/0244096 A1* | 8/2014 | An | G05D 1/0055 701/25 |
| 2016/0033965 A1* | 2/2016 | Kopetz | H04L 12/40182 701/23 |
| 2016/0325750 A1* | 11/2016 | Kanda | B60W 30/18163 |
| 2017/0057542 A1* | 3/2017 | Kim | B62D 15/025 |
| 2017/0129487 A1* | 5/2017 | Wulf | B60W 30/09 |
| 2017/0192429 A1* | 7/2017 | Tseng | G05D 1/0088 |
| 2017/0297576 A1* | 10/2017 | Halder | B60W 30/182 |
| 2017/0341575 A1* | 11/2017 | Hauler | B60Q 1/30 |

OTHER PUBLICATIONS

U.S. Appl. No. 62/316,357.*

* cited by examiner

*Primary Examiner* — Yazan A Soofi
(74) *Attorney, Agent, or Firm* — Womble Bond Dickinson (US) LLP

(57) ABSTRACT

Described is a system and method for providing an autonomous driving control mechanism in response to an emergency handling event using an emergency (or backup) control system. For example, in certain conditions such as a hardware or software failure, proper functioning of an autonomous driving control system may become compromised. Accordingly, the system may switch to an emergency decision system to continue to provide autonomous driving control functionality. In addition, the emergency decision system may switch to rules and/or a decision algorithm that prioritizes collision avoidance or safety concerns such as injury or fatality prevention in response to the emergency handling event.

20 Claims, 7 Drawing Sheets

EMERGENCY HANDLING SYSTEM FOR AN AUTONOMOUS DRIVING VEHICLE (ADV)

TECHNICAL FIELD

Embodiments of the present disclosure relate generally to operating autonomous vehicles. More particularly, embodiments of the disclosure relate to providing an emergency driving control system.

BACKGROUND

Vehicles operating in an autonomous mode (e.g. driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. When a vehicle is operating in an autonomous mode, however, certain events may occur that require immediate action. For example, in an emergency situation when there is a hardware or software failure for a component required for the autonomous driving system, a human driver may be expected to take over control of the vehicle. However, immediate human invention may not always be feasible in certain circumstances such as when a driver may not be alerted in time, or when a human driver may not be able to react in a sufficiently immediate manner. Accordingly, even in emergency situations, there may be instances where autonomous control may still be the most effective course of action.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

According to some embodiments, described is a system and method for providing an autonomous driving control mechanism in response to an emergency handling event using a secondary or emergency decision system. For example, in certain conditions such as a hardware or software failure, proper functioning of an autonomous driving control system may become compromised. Accordingly, in some embodiments, the system may switch to an emergency (or secondary or backup) decision system to continue to provide autonomous driving control functionality. In addition, in some embodiments, the emergency decision system may switch to rules and/or a decision algorithm that prioritizes collision avoidance or other safety concerns such as injury or fatality prevention in response to the emergency handling event. In one embodiment, the emergency decision system may be part of an emergency handling system that may include one or more redundant control components. Accordingly, the emergency handling system may provide continuous autonomous control in situations where a primary system may be comprised.

Figure 1:
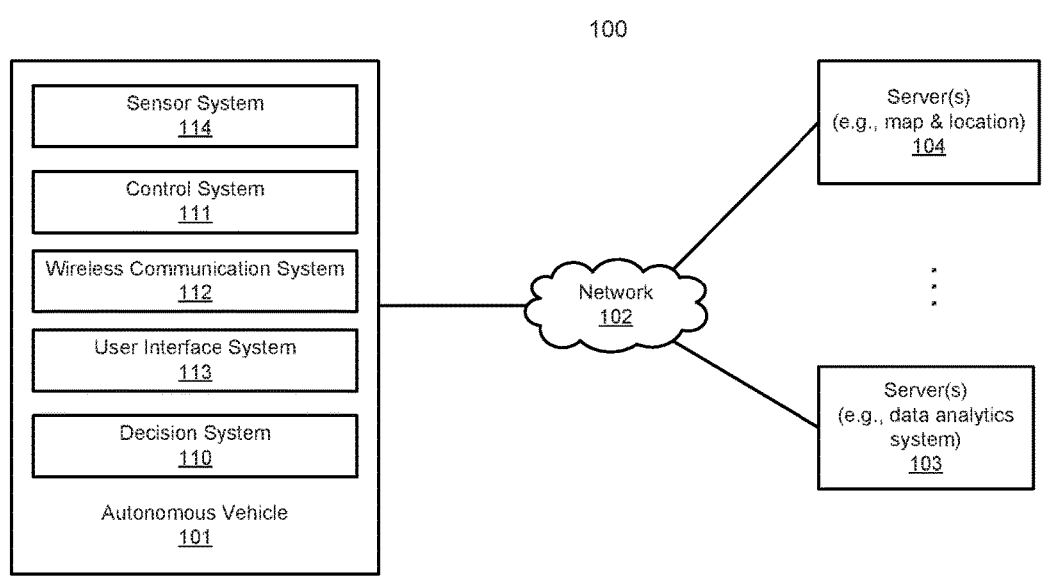
FIG. 1 is a block diagram illustrating an autonomous vehicle network configuration according to one embodiment of the disclosure.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle (or vehicle) refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 may include a decision system 110, vehicle control system 111, wireless communication system 112, user interface system 113, and sensor system 114. Autonomous vehicle 101 may further include certain common components included in ordinary vehicles, such as, an engine, wheels, steering wheel, transmission, etc., which may be controlled by vehicle control system 111 and/or decision system 110 using a variety of communication signals and/or commands, such as, for example, acceleration signals or commands, deceleration signals or commands, steering signals or commands, braking signals or commands, etc.

Components 110-114 may be communicatively coupled to each other via an interconnect, a bus, a network, or a combination thereof. For example, components 110-114 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
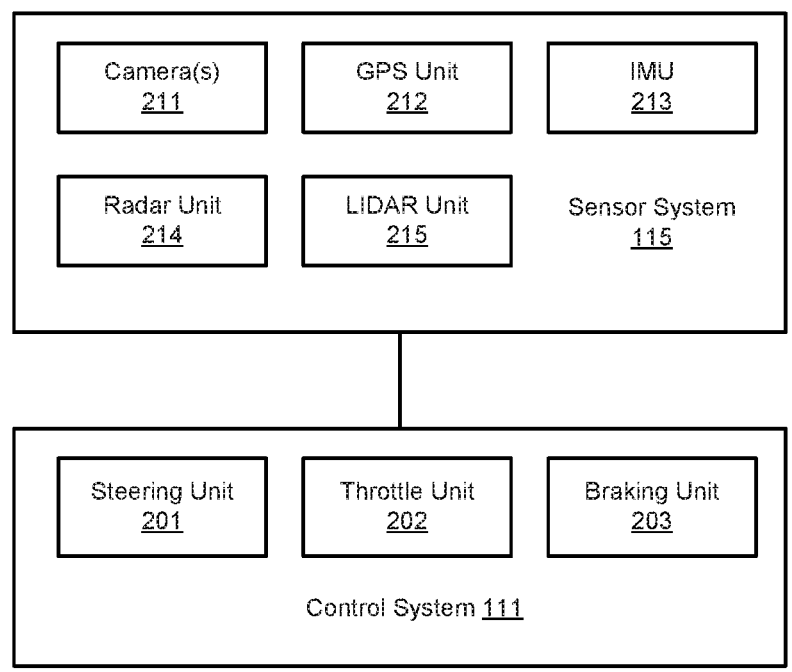
FIG. 2 is a block diagram illustrating a sensor and control system according to one embodiment of the disclosure.

Referring now to FIG. 2, in one embodiment, sensor system 114 may include one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 114 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 may include steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by decision system 110, especially when operating in an autonomous driving mode. Decision system 110 includes the necessary hardware (e.g., processor(s), memory, storage) and software (e.g., operating system, planning and routing programs) to receive information from sensor system 114, control system 111, wireless communication system 112, and/or user interface system 113, process the received information, plan a route or path from a starting point to a destination point, and then drive vehicle 101 based on the planning and control information. Alternatively, decision system 110 may be integrated with vehicle control system 111.

While autonomous vehicle 101 is moving along the route, decision system 110 may also obtain real-time traffic information from a traffic information system or server (TIS). Note that servers 103-104 may be operated by a third party entity. Alternatively, the functionalities of servers 103-104 may be integrated with decision system 110. Based on the real-time traffic information, MPOI information, and location information, as well as real-time local environment data detected or sensed by sensor system 114 (e.g., obstacles, objects, nearby vehicles), decision system 110 can plan an optimal route and drive vehicle 101, for example, via control system 111, according to the planned route to reach the specified destination safely and efficiently. In addition, in the event of an emergency handling event, the vehicle 101 may perform an evasive action as further described herein.

Figure 3:
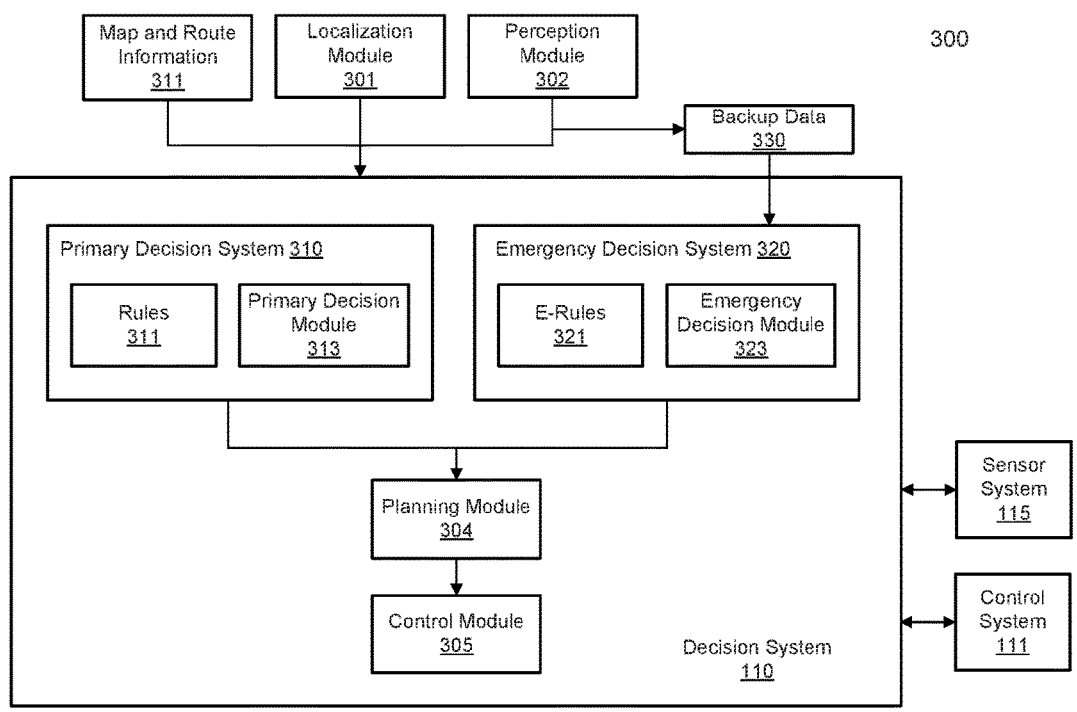
FIG. 3 is a block diagram illustrating example decision systems used with an autonomous vehicle according to one embodiment of the disclosure.

FIG. 3 is a block diagram illustrating example decision systems used with an autonomous vehicle according to one embodiment of the disclosure. System 300 may be implemented as a part of autonomous vehicle 101, or part of system 100, of FIG. 1. Referring to the embodiment of FIG. 3, system 300 includes, but is not limited to, localization module 301, map and route information 311, perception module 302, decision system 110, which may include a primary decision system 310 and an emergency decision system 320, planning module 304, and control module 305. As further described herein, the emergency decision system 320 may act as a secondary or backup decision system. Accordingly, the primary decision system 310 may include its own rules 311 and a primary decision module 313. Similarly, the emergency decision system 320 may include its own emergency rules (or E-rules) 321 and an emergency decision module 323.

Localization module 301 manages any data related to a trip or route of a user. A user may log in and specify a starting location and a destination of a trip, for example, via a user interface. Localization module 301 communicates with other components of autonomous vehicle 101, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 101 is moving along the route, localization module 301 may also obtain real-time traffic information from a traffic information system or server.

Based on the sensor data provided by sensor system 114 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

The map and route information 311, the localization module 301, and perception module 302, may provide data (primary data) utilized by the decision system 110. In one embodiment, the decision system 110 may include a primary decision system 310 and an emergency decision system 320, each including its own decision module. As further described herein, the emergency decision system 320 may be initiated in response to an emergency handling event. In general, however, decision modules 313/323 make a decision regarding how to handle the object identified by the perception module. For example, for a particular object (e.g., another vehicle in a crossing route) as well as its metadata describing the object (e.g., a speed, direction, turning angle), decision modules 313/323 decide how to encounter the object (e.g., overtake, yield, stop, pass). Decision modules 313/323 may make such decisions according to a set of rules such as traffic rules, which may be stored in persistent storage device.

Based on a decision for each of the objects perceived, planning module 304 plans a path or route for the autonomous vehicle, as well as driving parameters (e.g., distance, speed, and/or turning angle). For example, when the primary decision system 310 is in operation (e.g. normal or default operating mode), decision module 313 decides what to do with the object, while planning module 304 determines how to do it. For example, for a given object, decision module 313 may decide to pass the object, while planning module 304 may determine whether to pass on the left side or right side of the object. Planning and control data may be generated by planning module 304 including information describing how vehicle 101 would move in a next moving cycle (e.g., next route/path segment). For example, the planning and control data may instruct vehicle 101 to move 10 meters at a speed of 30 mile per hour (mph), then change to a right lane at the speed of 25 mph.

Based on the planning and control data, control module 305 (or control module 305A/B) controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In some embodiments, the primary decision system 310 may operate under normal operating conditions and the primary decision module 313 may utilize particular rules 311. These rules may provide a framework within which the primary decision module 313 operates. For example, these rules 311 may include traffic rules, route rules, ride comfort rules, etc. For instance, traffic rules may provide the primary decision system 310 with guidance on particular traffic rules in particular jurisdictions (e.g. right on red), or particular rules with respect to pedestrians or cyclists. Route rules may relate to providing guidance on particular preferences for routes (e.g. avoid tolls, etc.) and other rules related to navigation. Ride comfort rules, for example, maybe user specified. For example, ride comfort rules may include preferences for speed, gas mileage, terrain, etc.

As described, the primary decision system 310 may operate under normal driving conditions. In some circumstances, however, a secondary (or backup) or emergency system may be initiated. For example, in some embodiments, driving control of the vehicle 101 may switch from the primary decision system 310 to the emergency decision system 320 in response to an emergency handling event. Accordingly, the vehicle 101 may be controlled using a set of emergency rules 321. The emergency rules 321 may provide guidance with which the emergency decision module 323 operates. For example, the emergency rules 321 may include collision avoidance rules, and injury or fatality prevention rules. For example, emergency decision module 323 may further include collision avoidance decisions or functionalities of a collision avoidance system to identify, evaluate, and avoid or otherwise negotiate potential obstacles in the environment of the autonomous vehicle. For example, the emergency decision module 323 may effect changes in the navigation of the autonomous vehicle to undertake swerving maneuvers, turning maneuvers, braking maneuvers, etc. The emergency decision module 323 may automatically determine feasible obstacle avoidance maneuvers on the basis of surrounding traffic patterns, road conditions, etc. The emergency decision module 323 may be configured such that a swerving maneuver is not undertaken when other sensor systems detect vehicles, construction barriers, etc. in the region adjacent the autonomous vehicle that would be swerved into. The emergency decision module 323 may automatically select the maneuver that is both available and maximizes safety (e.g. injury or fatality prevention) of occupants of the autonomous vehicle. The emergency decision module 323 may also select an avoidance maneuver predicted to cause the least amount of acceleration in a passenger cabin of the autonomous vehicle.

In operation, in one embodiment, the emergency decision system 320 may utilize backup data 330. For example, the data provided by the map and route information 311, localization module 301, and perception module 302, may be stored in a secondary or backup storage as backup data 330. In some embodiments, the backup data 330 may include a subset of data such as data that is the most recent or relevant. Accordingly, the backup data 330 allows for continued operation even in instances where the primary data may be unavailable.

Figure 4:
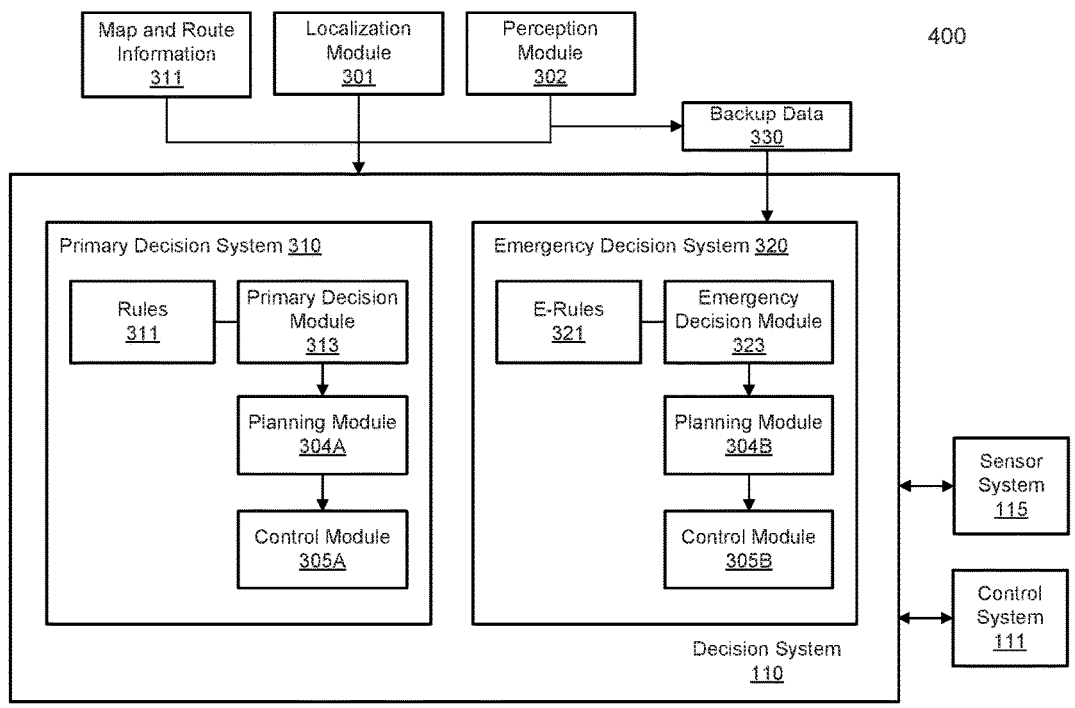
FIG. 4 is a block diagram illustrating example decision systems including redundant components used with an autonomous vehicle according to one embodiment of the disclosure.

FIG. 4 is a block diagram illustrating example decision systems including redundant components used with an autonomous vehicle according to one embodiment of the disclosure. System 400 may be implemented as a part of autonomous vehicle 101, or system 100, of FIG. 1. As shown, the embodiment of FIG. 4 includes a configuration including an emergency decision system 320 that includes planning module 304B and control module 305B as a backup or redundancy for planning module 304A and control module 305A of the primary decision system 310. Such a configuration may provide an additional layer of backup in instances where there may be a hardware or software failure related to one or more components of a system (e.g. systems 100, 300, or 400). For example, in the event of a software fault related to the control module 305A, the emergency decision system 320 may maintain or switch control, for example, to the control system 111 by utilizing control module 305B. In addition, although not shown, embodiments may include other backup or redundant components. For example, redundant or backup components such as software or hardware (e.g. physical components) related to the control system 111 or sensor system 115 may also be included in configurations.

In some embodiments, the emergency decision system 320 may be physically separate from the primary decision system 310. For example, the emergency decision system 320 may reside in a more secure (e.g. "black box") location to potentially remain functioning when other parts of the vehicle sustain damage. In addition, configurations may also may use other techniques to secure the emergency decision system 320 such as physical reinforcement and techniques to secure software components. For example, the emergency decision system 320 may be implemented behind a firewall, employ encryption, reside separately from an external communication system (e.g. to prevent unauthorized external access), reside on a different platform or operating system than other software components (e.g. primary decision system 310). Accordingly, configurations may secure the emergency decision system 320 in instances of physical damage, software faults, and to prevent malicious access.

It should be noted with respect to FIGS. 3 and 4, that decision modules 313/323 and planning module 304 may be integrated as an integrated module. For example, primary decision module 313 and planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In addition, some or all of modules (or systems) shown in FIGS. 3 and 4 may be implemented in software, hardware, or a combination thereof. For example, these modules may be installed in persistent storage device, loaded into memory, and executed by one or more processors. Note that some or all of these modules may be communicatively coupled to or integrated with some or all modules of vehicle control system 111 of FIG. 2. Some of modules may be integrated together as an integrated module. In addition, such components (e.g. modules and systems) can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
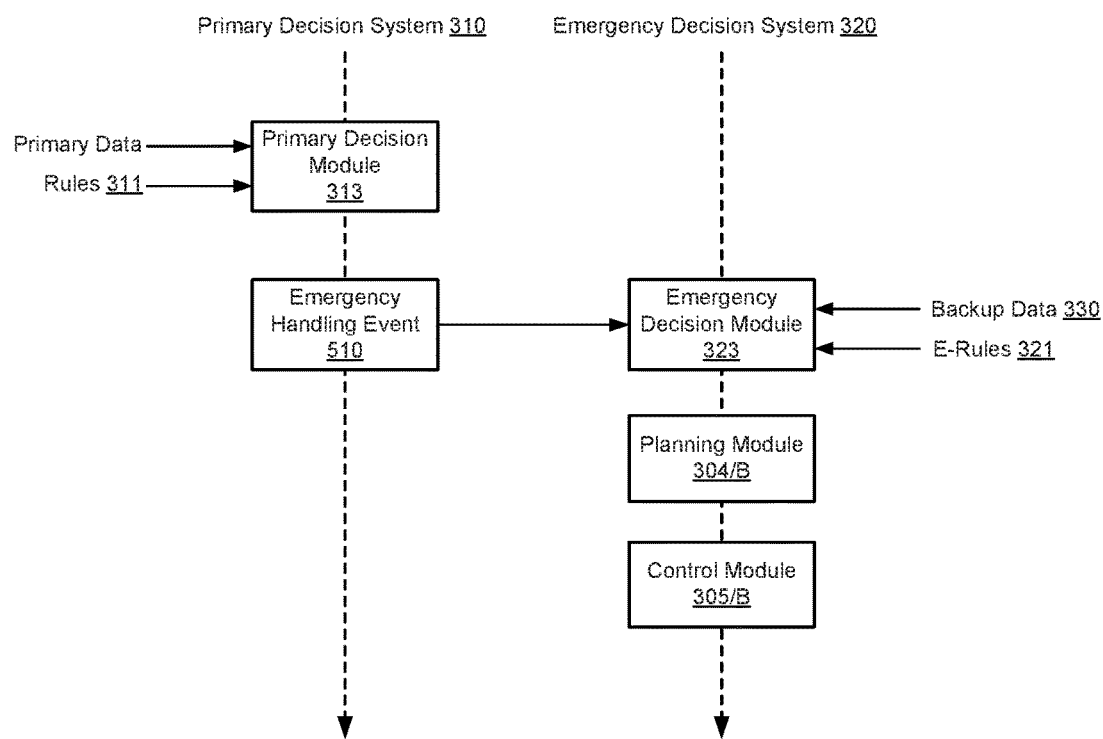
FIG. 5 is an example process flow illustrating an interaction between a primary decision system and a secondary (or emergency) decision system according to one embodiment of the disclosure.

FIG. 5 is an example process flow illustrating an interaction between a primary decision system 310 and an emergency (or secondary) decision system 320 according to one embodiment of the disclosure. As shown, the primary decision module 313 may operate referencing primary data and rules 311. For example, as described, the primary decision module 313 may operate under normal conditions. When an emergency handling event 510 is detected, operation may be switched to the emergency decision system 320. The emergency handling event 510 may include a hardware or software failure for a component associated with a system (e.g. control system 111, sensor system 115, etc.) for the vehicle. A failure of a component or system may be detected using various mechanisms such as a "heartbeat" component, or other background process that may monitor various components. In addition, the emergency handling event 510 may include a potential collision occurrence event or a high risk event. For example, the perception module 302 may detect a potential collision. A unrecognized high risk event may include other situations that may be high risk or potentially unknown to the system. For example, an unexpected weather event may be detected as a high risk event.

Once control is switched to the emergency decision module 323, control may be provided in a manner to maximize safety using emergency rules (E-rules) 321. For example, the emergency decision module 323 may provide control using an emergency algorithm that provides collision avoidance as described above.

In addition, as described, the emergency decision module 323 may refer to backup data 330 during operation. Once the emergency decision module 323 is initiated, driving control may continue using planning module 304/B and control module 305/B in a similar manner as described above.

Figure 6:
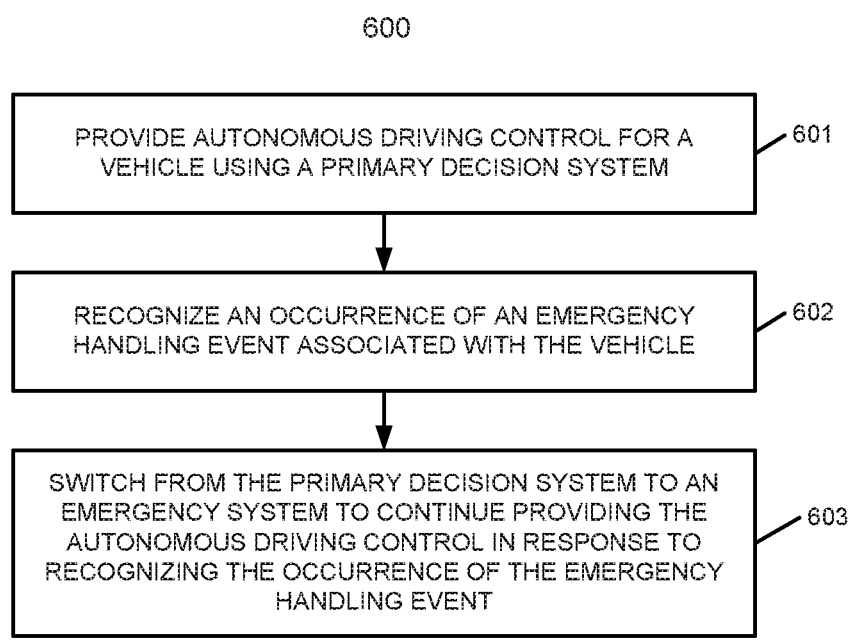
FIG. 6 is an example flow diagram illustrating a method of providing a secondary (or emergency) decision system according to one embodiment of the disclosure.

FIG. 6 is an example flow diagram illustrating a method of providing a secondary (or emergency) decision system according to an embodiment of the disclosure. Process 600 may use processing logic which may include software, hardware, or a combination thereof. For example, process 600 may be performed by a system (e.g. systems 100, 300 or 400), or a computing device or device.

In 601, the system may provide autonomous driving control for a vehicle (e.g. vehicle 101) using a primary decision system (e.g. primary decision system 310). The primary decision system may use a first set of driving rules (e.g. rules 311) to provide the driving control. For example, the first set of driving rules may include one or more traffic rules, route rules, and ride experience rules as described above.

In 602, the system may recognize an occurrence of an emergency handling event associated with the vehicle (e.g. emergency handling event 510). In one embodiment, the emergency handling event may include a hardware or software failure for a component associated with a system (e.g. control system 111, sensor system 115, etc.) for the vehicle. For example, the system may detect a hardware failure related to a component associated with steering unit 201, throttle unit 202, or braking unit 203. In an additional embodiment, the emergency handling event may include a potential collision occurrence event or an unrecognized high risk event.

In 603, in response to recognizing the occurrence of the emergency handling event, the system may switch from the primary decision system to an emergency decision system (e.g. emergency decision system 320) to continue providing the autonomous driving control for the vehicle. In one embodiment, the emergency decision system may prioritize a second set of driving rules (e.g. emergency rules 321) over the first set of driving rules to provide the driving control. For example, if the emergency handling event relates to a failure of a hardware component of the control system (e.g. control system 111), the emergency decision system may take evasive action. For instance, if there is a failure (e.g. hardware of software) related to the steering unit 201, the emergency decision system may direct the vehicle to slow down or stop in a safe manner. As described, in one embodiment, the emergency decision system may include redundant components (e.g. as shown in FIG. 4). Accordingly, in such an instance, the emergency decision system may use, for example, a secondary (or backup) component. The secondary component may include hardware components (e.g. secondary steering, throttle, or braking unit), or software components (e.g. planning module 304B, or control module 305B) to control the vehicle in manner to avert any potential collisions or further damage. In addition, the emergency decision system may also initiate additional safety measures. For example, the system may initiate one or more safety mechanisms such as deploying one or more airbags (or other safety devices) in anticipation of a potential collision.

Figure 7:
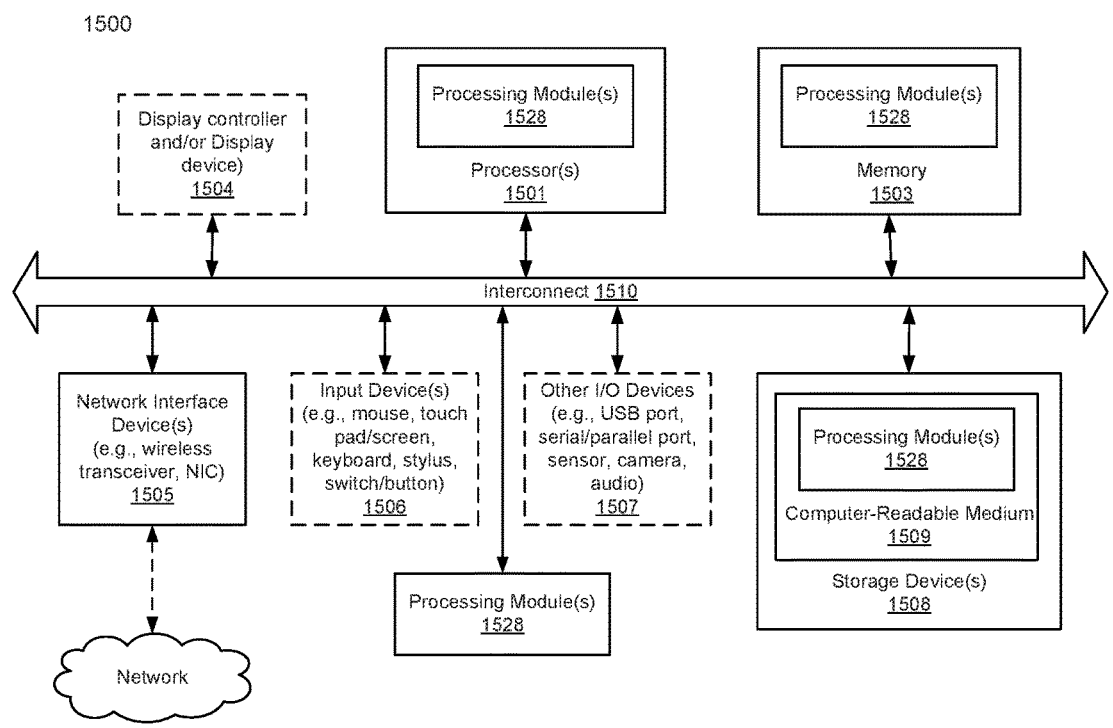
FIG. 7 is a block diagram illustrating an example computing system used in conjunction with one or more embodiments of the disclosure.

FIG. 7 is a block diagram illustrating an example computing system used in conjunction with one or more embodiments of the disclosure.

For example, system 1500 may represent any of data processing systems described above performing any of the processes or methods described above, such as, for example, one or more components 110-114 of the autonomous vehicle 101, or servers 103-104 described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-accessible storage medium 1509 (also known as a machine-readable storage medium or a computer-readable medium) on which is stored one or more sets of instructions or software (e.g., component, module, unit, and/or logic 1528) embodying any one or more of the methodologies or functions described herein.

Component/module/unit/logic (e.g. processing modules) 1528 may represent any of the components described above, such as, for example, decision system 110, sensor system 114, and control system 111 (and related modules and sub-modules). Component/module/unit/logic 1528 may also reside, completely or at least partially, within memory 1503 and/or within processor 1501 during execution thereof by data processing system 1500, memory 1503 and processor 1501 also constituting machine-accessible storage media. In addition, component/module/unit/logic 1528 can be implemented as firmware or functional circuitry within hardware devices. Further, component/module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; and phase-change memory).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   providing autonomous driving control for a vehicle using a primary decision system, wherein the primary decision system uses a first set of driving rules to provide the autonomous driving control;
   providing an emergency decision system operating standby as a backup system to the primary decision system, wherein the emergency decision system uses a second set of driving rules to control the vehicle, wherein the second set of driving rules is different than the first set of driving rules;
   recognizing an occurrence of an emergency handling event associated with the vehicle; and
   in response to recognizing the occurrence of the emergency handling event, switching from the primary decision system to the emergency decision system to continue providing the autonomous driving control for the vehicle, without using the primary decision system, wherein the emergency decision system prioritizes a second set of driving rules over the first set of driving rules to provide the autonomous driving control.

2. The method of claim 1, wherein the first set of driving rules includes one or more traffic rules, route rules, and ride experience rules.

3. The method of claim 2, wherein the second set of driving rules includes one or more collision avoidance rules, and injury or fatality prevention rules.

4. The method of claim 1, wherein the emergency handling event includes a hardware or software failure for a component associated with the primary decision system.

5. The method of claim 1, wherein the emergency handling event includes a potential collision occurrence event or an unrecognized high risk event.

6. The method of claim 1, wherein the primary decision system utilizes primary data and the emergency decision system utilizes backup data of the primary data.

7. The method of claim 1, wherein the emergency decision system continues providing the autonomous driving control using one or more redundant software or hardware components related to a control module or a control system.

8. A non-transitory machine-readable medium having instructions stored therein, which when executed by a processor, cause the processor to perform operations, the operations comprising:
   providing autonomous driving control for a vehicle using a primary decision system, wherein the primary decision system uses a first set of driving rules to provide the autonomous driving control;
   providing an emergency decision system operating standby as a backup system to the primary decision system, wherein the emergency decision system uses a second set of driving rules to control the vehicle, wherein the second set of driving rules is different than the first set of driving rules;
   recognizing an occurrence of an emergency handling event associated with the vehicle; and in response to recognizing the occurrence of the emergency handling event, switching from the primary decision system to the emergency decision system to continue providing the autonomous driving control for the vehicle, without using the primary decision system, wherein the emergency decision system prioritizes a second set of driving rules over the first set of driving rules to provide the autonomous driving control.

9. The medium of claim 8, wherein the first set of driving rules includes one or more traffic rules, route rules, and ride experience rules.

10. The medium of claim 9, wherein the second set of driving rules includes one or more collision avoidance rules, and injury or fatality prevention rules.

11. The medium of claim 8, wherein the emergency handling event includes a hardware or software failure for a component associated with the primary decision system.

12. The medium of claim 8, wherein the emergency handling event includes a potential collision occurrence event or an unrecognized high risk event.

13. The medium of claim 8, wherein the primary decision system utilizes primary data and the emergency decision system utilizes backup data of the primary data.

14. The medium of claim 8, wherein the emergency decision system continues providing the autonomous driving control using one or more redundant software or hardware components related to a control module or a control system.

15. A data processing system, comprising:
a processor; and
a memory coupled to the processor to store instructions, which when executed by the processor, cause the processor to perform operations, the operations including
providing autonomous driving control for a vehicle using a primary decision system, wherein the primary decision system uses a first set of driving rules to provide the autonomous driving control;
providing an emergency decision system operating standby as a backup system to the primary decision system, wherein the emergency decision system uses a second set of driving rules to control the vehicle, wherein the second set of driving rules is different than the first set of driving rules;
recognizing an occurrence of an emergency handling event associated with the vehicle; and
in response to recognizing the occurrence of the emergency handling event, switching from the primary decision system to the emergency decision system to continue providing the autonomous driving control for the vehicle, without using the primary decision system, wherein the emergency decision system prioritizes a second set of driving rules over the first set of driving rules to provide the autonomous driving control.

16. The system of claim 15, wherein the first set of driving rules includes one or more traffic rules, route rules, and ride experience rules, and the second set of driving rules includes one or more collision avoidance rules, and injury or fatality prevention rules.

17. The system of claim 15, wherein the emergency handling event includes a hardware or software failure for a component associated with the primary decision system.

18. The system of claim 15, wherein the emergency handling event includes a potential collision occurrence event or an unrecognized high risk event.

19. The system of claim 15, wherein the primary decision system utilizes primary data and the emergency decision system utilizes backup data of the primary data.

20. The system of claim 15, wherein the emergency decision system continues providing autonomous driving control using one or more redundant software or hardware components related to a control module or a control system.

* * * * *